US010386033B2

(12) United States Patent
Hadrath

(10) Patent No.: US 10,386,033 B2
(45) Date of Patent: Aug. 20, 2019

(54) LIGHTING APPARATUS

(71) Applicant: OSRAM GmbH, Munich (DE)

(72) Inventor: Stefan Hadrath, Falkensee (DE)

(73) Assignee: OSRAM GMBH, Munich (DE)

( * ) Notice: Subject to any disclaimer, the term of this patent is extended or adjusted under 35 U.S.C. 154(b) by 67 days.

(21) Appl. No.: 15/521,312

(22) PCT Filed: Sep. 30, 2015

(86) PCT No.: PCT/EP2015/072519
§ 371 (c)(1),
(2) Date: Apr. 24, 2017

(87) PCT Pub. No.: WO2016/062505
PCT Pub. Date: Apr. 28, 2016

(65) Prior Publication Data

US 2017/0307167 A1 Oct. 26, 2017

(30) Foreign Application Priority Data

Oct. 24, 2014 (DE) ........................ 10 2014 221 668

(51) Int. Cl.
*G01B 5/00* (2006.01)
*F21S 41/37* (2018.01)
(Continued)

(52) U.S. Cl.
CPC ............... *F21S 41/37* (2018.01); *F21S 41/14* (2018.01); *F21S 41/16* (2018.01); *F21S 41/285* (2018.01);
(Continued)

(58) Field of Classification Search
CPC . F21V 9/20; F21S 41/176; F21S 41/37; F21S 41/14; F21S 41/16
(Continued)

(56) References Cited

U.S. PATENT DOCUMENTS 8,226,254 B2 * 7/2012 Van Gorkom .... G02F 1/133603 362/2
2006/0239006 A1 10/2006 Chaves et al.
(Continued)

FOREIGN PATENT DOCUMENTS

DE 102011006536 A1 10/2011
DE 102012100446 A1 9/2012
(Continued)

OTHER PUBLICATIONS

German Search Report based on application No. 10 2014 221 668.0 (8 pages) dated Jun. 26, 2015.
(Continued)

*Primary Examiner* — Matthew J. Peerce
(74) *Attorney, Agent, or Firm* — Viering Jentschura & Partner MBB

(57) ABSTRACT

A lighting apparatus includes at least one primary light source for emitting primary light, at least one phosphor body arranged at a distance from the primary light source, for converting the wavelength of primary light into secondary light, and at least one at least partly dichroic mirror, which at least partly deflects primary light radiated thereon onto at least one phosphor body and which passes secondary light radiated by the phosphor body. Used light radiated by the lighting apparatus contains the secondary light and primary light radiated by at least one primary light source, and the dichroic mirror includes at least one first and second mirror regions, in such a way that the first mirror region deflects primary light onto at least one phosphor body and passes secondary light incident from the phosphor body, and that the second mirror region deflects primary light in a manner circumventing the phosphor body.

14 Claims, 4 Drawing Sheets

(51) Int. Cl.

| | |
|---|---|
| ***F21V 9/30*** | (2018.01) |
| ***F21S 41/20*** | (2018.01) |
| ***F21S 41/14*** | (2018.01) |
| ***F21S 41/32*** | (2018.01) |
| ***F21V 7/22*** | (2018.01) |
| ***F21V 13/08*** | (2006.01) |
| ***F21V 7/04*** | (2006.01) |
| ***F21S 41/16*** | (2018.01) |
| *F21Y 101/00* | (2016.01) |
| *F21Y 115/30* | (2016.01) |

(52) U.S. Cl.
CPC .............. *F21S 41/321* (2018.01); *F21V 7/04* (2013.01); *F21V 7/22* (2013.01); *F21V 9/30* (2018.02); *F21V 13/08* (2013.01); *F21Y 2101/00* (2013.01); *F21Y 2115/30* (2016.08)

(58) Field of Classification Search
USPC .......................................................... 362/460
See application file for complete search history.

(56) References Cited

U.S. PATENT DOCUMENTS

| | | | |
|---|---|---|---|
| 2011/0242502 | A1 | 10/2011 | Shibasaki |
| 2012/0243205 | A1 | 9/2012 | Lin |
| 2013/0215397 | A1 | 8/2013 | Matsubara |
| 2013/0250255 | A1 | 9/2013 | Kurosaki et al. |
| 2014/0111967 | A1 | 4/2014 | Rehn |

FOREIGN PATENT DOCUMENTS

| | | | |
|---|---|---|---|
| DE | 102012219387 | A1 | 4/2014 |
| WO | 2008072185 | A1 | 6/2008 |

OTHER PUBLICATIONS

International Search Report based on application No. PCT/EP2015/072519 (6 pages + 3 pages English translation) dated Nov. 9, 2015.

* cited by examiner

LIGHTING APPARATUS

RELATED APPLICATIONS

The present application is a national stage entry according to 35 U.S.C. § 371 of PCT application No.: PCT/EP2015/072519 filed on Sep. 30, 2015, which claims priority from German application No.: 10 2014 221 668.0 filed on Oct. 24, 2014, and is incorporated herein by reference in its entirety.

TECHNICAL FIELD

The present disclosure relates to a lighting apparatus including at least one primary light source for emitting primary light, at least one phosphor body arranged at a distance from the primary light source, for converting the wavelength of primary light into secondary light, at least one at least partly dichroic mirror, which at least partly dichroic mirror at least partly deflects primary light radiated thereon onto at least one phosphor body and which passes secondary light radiated by the phosphor body, wherein used light radiated by the lighting apparatus contains the secondary light and primary light directly radiated by at least one primary light source. By way of example, the present disclosure may be applied to vehicle lighting apparatuses, in particular to headlamps/spotlights. The present disclosure may also be applied to lighting apparatuses in the entertainment field, for example for stage lighting, and/or for image projection.

BACKGROUND

LARP ("laser-activated remote phosphor") lighting apparatuses are known for the purposes of producing white light by means of a laser light source, said LARP lighting apparatus partly wavelength-converting or converting primary light emitted by the laser light source into yellow secondary light by means of a phosphor body and mixing said yellow secondary light with a non-converted component of the blue primary light to form a blue-yellow or white mixed light.

To this end, a LARP lighting apparatus is known, in which some of the blue primary light radiated by a laser is reflected onto a phosphor body by way of a front side of a dichroic mirror which is embodied to reflect said light and the secondary light produced by the phosphor body passes through this dichroic mirror and may then be output coupled. Another part of the blue primary light radiated by the laser, at the phosphor, is radiated past the dichroic mirror onto a deflection mirror system which guides the primary light onto a rear side of the dichroic mirror which is embodied to reflect said light in order to unify this primary light component with the secondary light beam passing through the dichroic mirror.

Another LARP lighting apparatus is known; here, all of the blue primary light radiated by a laser is reflected onto a phosphor body by way of a front side of a dichroic mirror embodied to reflect said light and the secondary light produced by the phosphor body is output coupled through this dichroic mirror. The blue light component of the mixed light is produced by a second laser radiating blue primary light, said second laser being directed directly onto a rear side of the dichroic mirror which is reflecting said light.

A disadvantage of the aforementioned LARP lighting apparatuses lies in the comparatively complicated and high-volume structure thereof.

SUMMARY

It is the object of the present disclosure to at least partly overcome the disadvantages of the prior art and, in particular, provide a lighting apparatus including a phosphor body, said lighting apparatus requiring less outlay in the production thereof and facilitating a particularly compact and robust structure.

This object is achieved in accordance with the features of the independent claims. Preferred embodiments may be gathered, in particular, from the dependent claims.

The object is achieved by a lighting apparatus including at least one light source (referred to below as "primary light source" without loss of generality) for emitting light (referred to below as "primary light" without loss of generality), at least one phosphor body arranged at a distance from the primary light source, for converting the wavelength of primary light into light with a different wavelength (referred to below as "secondary light" without loss of generality), at least one at least partly dichroic mirror, which at least partly deflects primary light radiated thereon by at least one primary light source onto at least one phosphor body and which passes secondary light radiated by the phosphor body, wherein used light radiated by the lighting apparatus contains the secondary light and primary light radiated directly (i.e. without interaction with the phosphor body) by at least one primary light source, and wherein the at least one at least partly dichroic mirror includes at least one first dichroic mirror region and at least one second mirror region, in such a way that the at least one first mirror region deflects primary light radiated thereon by at least one primary light source onto at least one phosphor body and passes secondary light incident from the phosphor body, and that the at least one second mirror region deflects primary light radiated thereon by at least one primary light source in a manner circumventing the phosphor body.

This lighting apparatus requires neither a deflection mirror system nor an additional light source for the purposes of providing the primary light component in the used light. It makes do with particularly few components, reducing the procurement costs, simplifying the structure thereof and, in particular, facilitating a particularly compact and robust structure.

The primary light source radiates primary light in a first ("primary") light spectrum. The primary light spectrum may contain visible, infrared and/or ultraviolet light components.

The phosphor body includes at least one phosphor which is able to convert at least some of the primary light radiated thereon by the primary light source into secondary light. If a plurality of phosphors are present, these may produce secondary light with mutually differing wavelengths. The wavelength of the secondary light may be longer (so-called "down conversion") or shorter (so-called "up conversion") than the wavelength of the primary light. By way of example, blue primary light may be converted into green, yellow, orange or red secondary light by means of a phosphor. In the case of an only partial conversion of the wavelength, the phosphor body radiates a mixture of secondary light and non-converted primary light. However, complete conversion is also possible, in which practically all of the primary light is converted into at least one secondary light. A degree of conversion depends, for example, on a thickness and/or a phosphor concentration of the phosphor. If a plurality of phosphors are present, secondary light components with different spectral compositions may be produced by the primary light, for example yellow and red secondary light. By way of example, the red secondary light may be used to provide the used light with a warmer hue, for example within the meaning of a so-called "warm white" light color. If a plurality of phosphors are present, at least one phosphor may be suitable to once again convert the wavelength of secondary light, e.g. convert green secondary light into red secondary light. Such a light whose wavelength has yet again been converted from a secondary light may also be referred to as "tertiary light".

Since the phosphor body is arranged at a distance from the primary light source, it may also be referred to as a "remote phosphor" and it facilitates, inter alia, particularly high beam intensities and effective cooling.

The at least partly dichroic mirror may be entirely dichroic or partly dichroic. The at least partly dichroic mirror may therefore also simply be referred to as "dichroic mirror" below, without loss of generality.

Here, at least the first, dichroic mirror region is able, in particular, to reflect practically the entire (i.e., at least 90%, in particular at least 95%) primary light component incident thereon and pass practically the entire (i.e., at least 90%, in particular at least 95%) secondary light component. By way of example, at least the first, dichroic mirror region may be an interference mirror. Thus, in respect of primary light incident thereon, the first, dichroic mirror region is, in particular, only arranged to deflect this primary light onto the phosphor body (optionally with interposition of further optical elements). Consequently, it is, in particular, not arranged to direct primary light incident thereon past the phosphor body.

Thus, the used light may contain the secondary light passed by a dichroic mirror and primary light directly radiated by at least one primary light source (i.e. primary light not radiated onto a phosphor body). An output coupling optical unit disposed optically downstream of the at least one dichroic mirror may be present for the purposes of output coupling of this mixed used light. Said output coupling optical unit may include one or more optical elements, for example at least one lens, stop, diffuser, light guide, etc.

The primary light component deflected by the at least one second mirror region may thus be mixed to the secondary light without requiring a separate deflection mirror system or an additional primary light source.

A development which may be implemented particularly easily is that the lighting apparatus has exactly one first dichroic mirror region. The simple implementability is achieved by the development that the lighting apparatus has exactly one second mirror region. By contrast, a plurality of first and/or second mirror regions provide the advantage of particularly versatile beam-shaping. Thus, both developments include e.g. the case that the lighting apparatus has exactly one first dichroic mirror region and exactly one second mirror region. By way of example, this also includes the case where the lighting apparatus has exactly one first dichroic mirror region and a plurality of second mirror regions or a plurality of first mirror regions and exactly one second mirror region. In particular, only the second mirror region is provided for exclusively deflecting incident primary light past the phosphor body.

Another configuration is that an area centroid of the second mirror region is arranged within a plane spanned by the first mirror region (referred to below as "plane of extent" of the first mirror region without loss of generality). In the case of a plane first mirror region, the plane of extent is the planar plane in which the first mirror region lies, etc.

Another configuration is that the at least one first mirror region and the at least one second mirror region have disjoint areas in relation to an irradiation by the primary light and/or the secondary light, or are disjoint areas, i.e., in particular, do not optically overlap in respect of the emitted direction of the used light. This facilitates a particularly high light yield and homogeneous intensity distribution (e.g. by avoiding dark edges), in particular in respect of incoming or passed radiation of secondary light.

A further configuration is that the at least one first mirror region and the at least one second mirror region (or the disjoint areas thereof) practically completely fill a radiation cross section of the secondary light. Expressed differently, the secondary light beam radiated by the at least one phosphor body passes practically completely through the dichroic mirror. The radiation cross section of the secondary light may correspond to an optical area of the lighting apparatus in the direction of the radiation of the used light. "Practically completely" may be understood to mean, in particular, a value of 90% or more, in particular of 95% or more, in particular of greater than 99% or more, in particular of 100%. By way of example, more than 95% of the secondary light beam radiated by the at least one phosphor body may radiate through the dichroic mirror. The possibly remaining remainder totaling up to 100% may e.g. include radiation of the secondary light going past the dichroic mirror. By way of example, this residual component may emerge due to an (e.g. production-related) narrow gap between the first mirror region and the second mirror region in the direction of the secondary light beam.

Another configuration is that at least one second mirror region is a dichroic mirror region. This facilitates particularly low losses of the secondary light. The optical properties of the at least one first mirror region and of the at least one second mirror region may be the same or different, in particular in relation to the reflected or passed spectrum, a degree of transmission, etc. In particular, the second mirror region may also reflect the primary light and pass secondary light.

By way of example, the at least one first dichroic mirror region and/or the at least one second dichroic mirror region may include a carrier body made of glass, transparent ceramics or plastics, on which e.g. a plurality of interference layers have been applied for the purposes of establishing the dichroic effect.

A further configuration is that at least one second mirror region is a non-dichroic mirror region. This may achieve a particularly low light loss of the primary light component not radiated onto a phosphor body, as a result of which the second mirror region, in turn, may have a particularly small embodiment. The non-dichroic mirror region may also include a carrier body, for example made of glass, transparent ceramics or plastics.

An even further configuration is that at least one first, dichroic mirror region and at least one second mirror region are parts of a common mirror. The mirror regions were produced as integrally connected to one another or with one another, and not produced separately and only then connected to one another. This configuration facilitates a particularly compact arrangement without connection element(s) or with only very small connection elements, and hence particularly low light losses and/or simplified handling. It may be implemented particularly easily if the at least one first mirror region and the at least one second mirror region are dichroic mirror regions with the same optical properties. By way of example, the production of such a common mirror may be obtained by means of a plastic injection-molded carrier or a suitably formed glass carrier.

Another even further configuration is that at least one first mirror region and at least one second mirror region are separately produced mirrors or mirror regions, or correspond to these. This assists differing configurations of these mirrors or mirror regions. This configuration may be implemented particularly advantageously if the at least one first mirror and the at least one second mirror have different properties, e.g. different curvatures, different dichroic properties, or if at least one second mirror region is non-dichroic. By way of example, at least one first mirror and at least one second mirror may be affixed in relation to one another by means of a carrier device. By way of example, the carrier device may include a holder made of metal or transparent plastic. By way of example, however, the carrier device may also only be one or more mass volumes cohesively connecting the separately produced mirrors, e.g. one or more soldering points or one or more plastic drops, for example made of light-transmissive silicone, epoxy resin or any other adhesive.

A further configuration is that the at least one first mirror region and/or the at least one second mirror region is a plane mirror region or are plane mirror regions. This may be produced in a particularly simple manner.

Also, a configuration is that the at least one second mirror region is a curved mirror region. This facilitates particularly versatile beam-shaping of the primary light component incident thereon, for example beam widening. By way of example, the curvature may be roller-like or sphere-like. By way of example, it may be convex, concave or free-form and/or be faceted.

A development is that the at least one first mirror region is a curved mirror region.

Moreover, a configuration is that the at least one second mirror region is arranged with angular offset or a tilt, in particular through 90°, in relation to at least one first mirror region. In a particularly simple manner, this allows primary light radiation incident on the second mirror region to be uniformly coupled in a particularly simple manner into the secondary light beam passed by the first mirror region, for example in the case of a tilt angle or angle offset of 90° in the same direction as, or with a beam direction parallel to (in particular corresponding with), a beam direction of the secondary light beam. The tilt or the angle offset may apply, in particular, in respect of a tilt axis which is perpendicular to a plane which is spanned by an incident beam direction of the primary light on the first mirror region and a beam direction of the primary light component reflected onto the phosphor body at said location.

Moreover, a configuration is that at least one second mirror region is arranged in a circumferentially bounded opening, in particular in a central opening, of a first mirror region. As a result, the primary light radiation incident on the second mirror region may be coupled centrally into the secondary light beam, simplifying the uniform mixing thereof.

Also, another configuration is that at least one second mirror region is arranged in an opening, open on an edge side, of a first mirror region.

A development is that a first mirror region includes a plurality of circumferentially bounded openings and/or openings open on an edge side, at or in which a respective second mirror region is arranged. As a result, a particularly versatile distribution of the primary light beams reflected by the second mirror regions may be obtained in a secondary light beam. In particular, this may simplify a color homogenization over the cross section of the mixed used light beam. A development thereof is that the openings and second mirror regions are arranged in a uniform manner at the first mirror region, for example in a ring-shaped or matrix-like manner. The angle offset of the second mirror regions in relation to the first mirror region may be equal, or the angle offset of at least two second mirror regions may be different.

Moreover, a further configuration is that at least one second mirror region and at least one first mirror region are mirror regions arranged in series. Thus, the second mirror region is not arranged in an opening of the first mirror region but arranged entirely next to the first mirror region. In particular, a first mirror region and a second mirror region may have the same width.

A further configuration is that at least one microlens field is disposed downstream of the at least one first mirror region and the at least one second mirror region. This advantageously facilitates a particularly homogeneous mixture of the secondary light beam and of the primary light component reflected by the at least one second mirror region.

An even further configuration is that the at least one phosphor body is arranged in a reflecting arrangement. In comparison with a transmissive arrangement (which, in principle, is also possible), this facilitates a particularly low-loss complete conversion and simplified or stronger cooling of the phosphor body. In particular, a reflective arrangement of a phosphor body may be understood to mean an arrangement in which the side on which the primary light is incident also radiates the secondary light used for use in the used light. To this end, the phosphor body, with the side thereof facing away from this, may lie on a carrier which reflects the primary light and the secondary light.

Moreover, a configuration is that the at least one primary light source includes at least one semiconductor source. The at least one semiconductor light source may include at least one light-emitting diode and/or at least one laser, in particular a laser diode. A plurality of light-emitting diodes or laser diodes may be present in the form of a “field” or an “array”. The at least one light-emitting diode may be available in the form of at least one individually packaged light-emitting diode or in the form of at least one LED chip. The plurality of LED chips may be assembled on a common substrate (“submount”). The at least one light-emitting diode and/or the at least one laser may be equipped with at least one dedicated and/or common optical unit for beam guidance, for example with at least one Fresnel lens, collimator, and so on. In place of, or in addition to, inorganic light-emitting diodes, e.g. on the basis of InGaN or AlInGaP, organic LEDs (OLEDs, e.g. polymer OLEDs) may also be used in general.

Further, a development is that the lighting apparatus is a vehicle lighting apparatus, in particular for external illumination. By way of example, the vehicle may be a land-borne vehicle such as an automobile, a truck or a motorbike, or else a waterborne vehicle or an airborne vehicle such as an airplane or a helicopter. In particular, the vehicle lighting apparatus is a headlamp. Another development is that the lighting apparatus is an entertainment lighting apparatus, in particular for stage lighting and/or effect lighting. Another development is that the lighting apparatus is a lighting apparatus for image projection, e.g. an image projector or part thereof.

BRIEF DESCRIPTION OF THE DRAWINGS

The above-described properties, features and advantages of the present disclosure and the manner in which they are achieved will become clearer and more easily understandable in conjunction with the following schematic description of embodiments, which are explained in more detail in conjunction with the drawings. Here, for reasons of clarity, the same elements or elements with the same effect may be provided with the same reference sign.

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
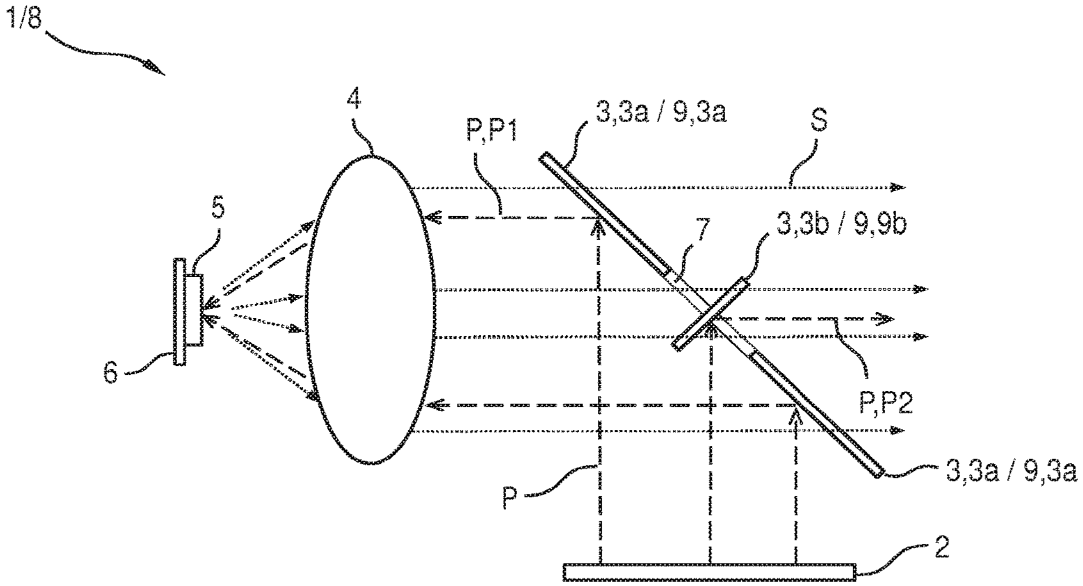
FIG. 1 shows a side view of a structure of a lighting apparatus including a dichroic mirror in accordance with a first embodiment in a sectional illustration.

FIG. 1 shows a side view of a structure of a lighting apparatus in the form of a LARP headlamp/spotlight 1 in a sectional illustration, for example for vehicle lighting or stage lighting. The LARP headlamp/spotlight 1 includes at least one primary light source in the form of at least one laser 2 (e.g. a laser-diode array, a single laser diode, etc.) in order to radiate a primary light beam made of blue primary light P onto a dichroic mirror 3.

The dichroic mirror 3 includes a plane first dichroic mirror region 3*a* and a plane second dichroic mirror region 3*b*. The two mirror regions 3*a* and 3*b* have the same structure and reflect the blue primary light P. While here this refers in a purely exemplary manner to two mirror regions 3*a* and 3*b* of a common dichroic mirror 3 (the two mirror regions 3*a* and 3*b* are therefore parts of a single mirror 3), the two mirror regions 3*a* and 3*b* may be produced separately in an alternative variant and then affixed to one another by means of e.g. an affixment device (a mechanical frame, a solder connection or the like; not depicted here) for the purposes of providing the then multi-part dichroic mirror 3.

The first mirror region 3*a* is aligned in such a way that it deflects the primary light P incident thereon onto a phosphor body 5 via a lens 4. Thus, the phosphor body 5 is arranged at a distance from the at least one laser 2, while the first dichroic mirror region 3*a* is arranged optically between the at least one laser 2 and the phosphor body 5. At the phosphor body 5, the incident component P1 of the primary light P is converted into at least one secondary light S, e.g. into yellow, green, red and/or orange secondary light S.

On the side thereof facing away from the incident primary light P, the phosphor body 5 is arranged on a carrier 6 which reflects the primary light P and the secondary light S. Consequently, light is only radiated as used light component from that side of the phosphor body 5 on which the primary light beam P1 is also incident. This is also referred to as a "reflecting" or "reflective" arrangement, which has particularly low losses and may be cooled particularly easily. In the present embodiment, the primary light P is completely converted into secondary light S by the phosphor body 5. The secondary light S radiated by the phosphor body 5 is guided onto both mirror regions 3*a* and 3*b* by the lens 4. Since both mirror regions 3*a* and 3*b* are transmissive for the secondary light S, the secondary light S is provided, practically in the entirety thereof, optically downstream of the dichroic mirror 3, for example for output coupling from the LARP headlamp/spotlight 1.

The second dichroic mirror region 3*b* is aligned in such a way that primary light P radiated thereon is deflected in a manner circumventing the phosphor body 5, to be precise in the direction of the secondary light beam S. To this end, the second dichroic mirror region 3*b* has an angular offset through 90° from the first mirror region 3*a*, to be precise about an axis of rotation or tilt axis which is perpendicular to a plane spanned by an incoming radiation direction of the primary light P on the first mirror region 3*a* and a direction of the component P2 of the primary light P reflected at said location onto the phosphor body 5. Here, this plane corresponds to the plane of the sheet.

As a result, a component P2 of the primary light P is deflected by the second mirror region 3*b* in a direction which corresponds to the direction of the secondary light S passing through the mirror 3. Thus, the used light radiated by the LARP headlamp/spotlight 1 includes the secondary light S and the primary light component P2 reflected by the second mirror 3*b* (and therefore directly radiated by the at least one laser 2). By way of example, the used light may be white light, for example based on a blue-yellow color mixture with e.g. additional red and/or orange light components for producing a "warm white" color impression.

Here, the tilt axis also extends through a central area centroid of the second mirror region 3*b*, said area centroid being arranged within a planar plane of extent spanned by the first mirror region 3*a*.

In respect of the incoming radiation of the primary light P, the first mirror region 3*a* and the second mirror region 3*b* are disjoint or non-overlapping such that primary light P incident on the area of the first mirror region 3*a* facing the at least one laser 2 is not shadowed by the second mirror region 3*b*. Nor has the secondary light S incident on the second mirror region 3*b* previously run through the first mirror region 3*a*.

Figure 2:
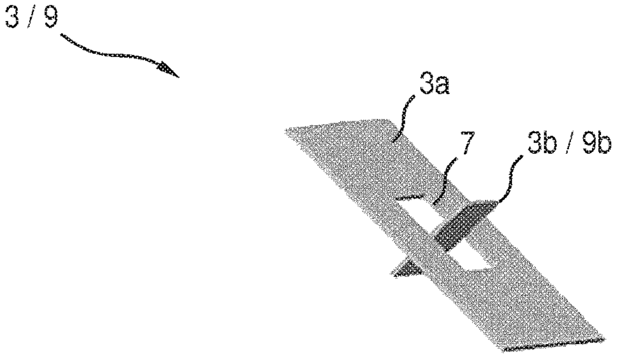
FIG. 2 shows an oblique view of the dichroic mirror in accordance with the first embodiment.

As also shown in the oblique view of the dichroic mirror 3 in FIG. 2, the second mirror region 3*b* is arranged in a central opening 7 of the first mirror region 3*a*. As a result, the primary light component P2 reflected by the second mirror region 3*b* extends at least approximately centrally in the secondary light beam S. The component P2 of the primary light P in the used light P2, S may easily be set by way of an area and/or form of the second mirror region 3*b* and/or, also, e.g. by a cross-sectional area of the primary light P incident on the mirror 3.

Beam shaping of the used light emanating from the dichroic mirror 3 may be carried out by at least one further optical element (not depicted here).

FIG. 1 and FIG. 2 can also show a further LARP headlamp/spotlight 8, in which—in the case of the same mirror region 3*a*-*a* second mirror region 9*b*, which has the same form and arrangement as the second mirror region 3*b*, of an at least partly dichroic mirror 9 does not have a dichroic embodiment, but simply has a specular embodiment. Hence, the second mirror region 9*b* reflects both the primary light P and the secondary light S. Such a second mirror region 9*b* may be easier to produce and more cost-effective than the mirror region 3*b*, particularly in the case of a separate production (in which the two mirror regions 3*a* and 9*b* then, in particular, correspond to separate mirrors). Then, the secondary light S incident from the phosphor body 5 onto the second mirror region 9*b* may be lost.

Figure 3:
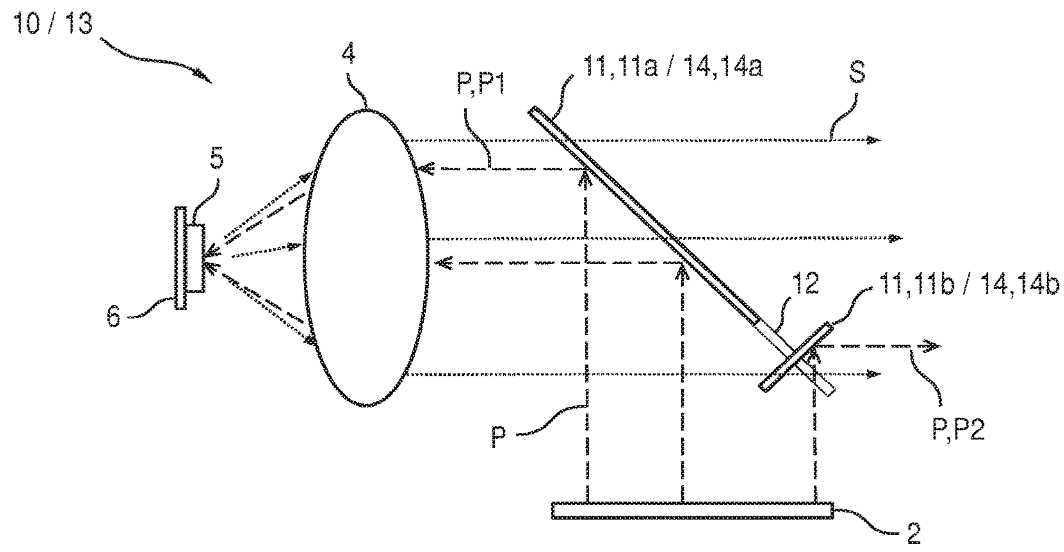
FIG. 3 shows a side view of a structure of a lighting apparatus including a dichroic mirror in accordance with a second embodiment or a third embodiment in a sectional illustration.
Figure 4:
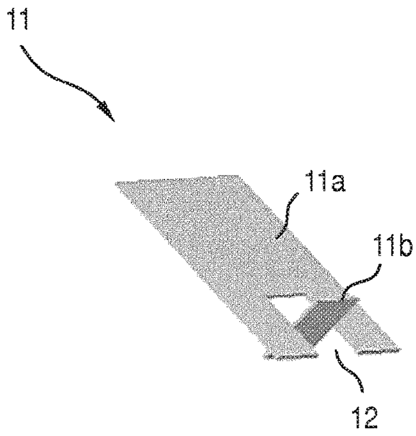
FIG. 4 shows an oblique view of the dichroic mirror in accordance with the second embodiment.

FIG. 3 shows a side view of a setup of an LARP headlamp/spotlight 10 including an at least partly dichroic mirror 11, which is also shown in FIG. 4 in an oblique view, in a sectional illustration.

In contrast to the LARP headlamps/spotlights 1 or 8, a dichroic or non-dichroic second mirror (region) 11*b* of the mirror 11 is now arranged in an opening 12, open on an edge side, of a first, dichroic mirror region 11*a*, wherein a tilt axis (perpendicular to the plane of the sheet) of the second mirror region 11*b* is arranged within the areal extent of the first mirror region 11*a*. As a result, the component P2 of the primary light P reflected by the second mirror region 11*b* may extend along the edge in the beam of the secondary light S.

Figure 5:
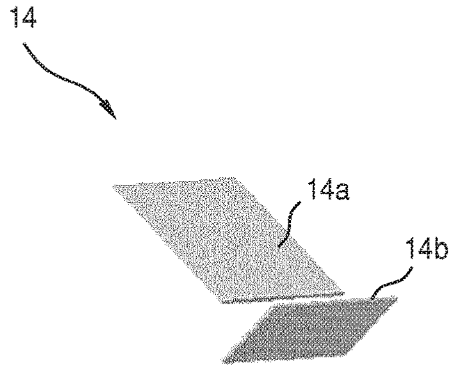
FIG. 5 shows an oblique view of the dichroic mirror in accordance with the third embodiment.

FIG. 3 may also show an LARP headlamp/spotlight 13, the at least partly dichroic mirror 14 of which is shown in an oblique view in FIG. 5. In comparison with the LARP headlamp/spotlight 10, in this case the second mirror (region) 14*b* now is not arranged in an opening of an associated first, dichroic mirror region 14*a*, but instead it is arranged in series therewith. The two mirror regions 14*a* and 14*b* have the same width. They adjoin one another along a projection in the direction of the incident primary light P, advantageously in a practically gap-free manner for the purposes of avoiding light losses.

By way of example, the mirror regions 11*b* and 14*b* may alternatively also have a non-dichroic embodiment in this embodiment.

Figure 6:
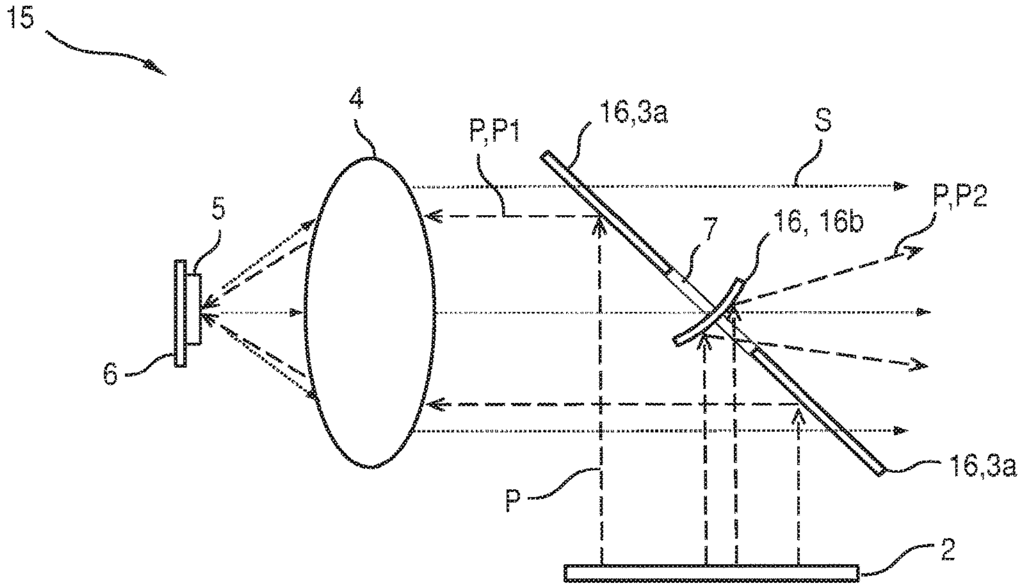
FIG. 6 shows a side view of a structure of a lighting apparatus including a dichroic mirror in accordance with a fourth embodiment in a sectional illustration.

FIG. 6 shows a side view of a structure of an LARP headlamp/spotlight 15 similar to the LARP headlamps/spotlights 1 or 8 in a sectional illustration. In contrast to these, the dichroic or non-dichroic second mirror region 16*b* of an at least partly dichroic mirror 16 has a curved embodiment. To be precise, the second mirror region 16*b* in this case has a convex form in relation to the incident primary light P. As a result, beam-shaping of the reflected primary light beam P2 may be achieved, for example the widening thereof for improved spatial color mixing.

Figure 7:
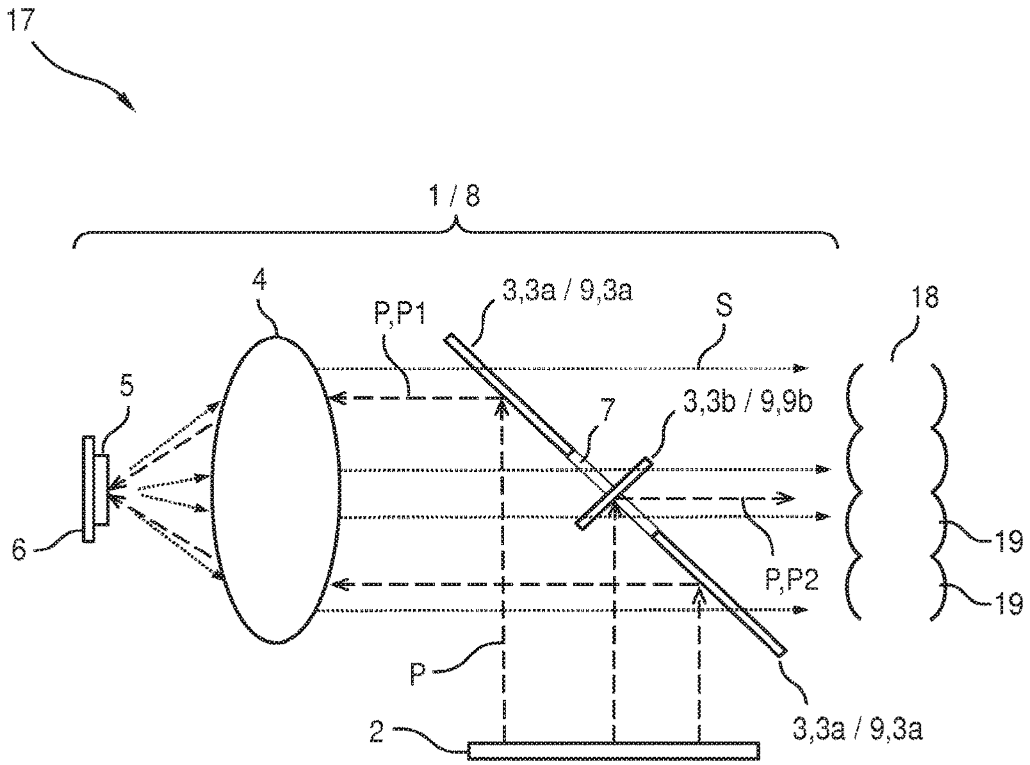
FIG. 7 shows a side view of a structure of a lighting apparatus in accordance with a fifth embodiment in a sectional illustration.

FIG. 7 shows a side view of a structure of an LARP headlamp/spotlight 17 in a sectional illustration. Here, the LARP headlamp/spotlight 17 has a structure like the LARP headlamp/spotlight 1 or 8 (alternatively, for example, like one of the LARP headlamps/spotlights 10, 13 or 15), wherein the used light P2, S output coupled therefrom is still guided through a microlens field 18 (which is therefore optically disposed downstream of the mirror 11) for the purpose of color mixing. To this end, the microlens field 18 has a field of small lens regions 19 or "lenslets" on both sides. As a result, a homogeneous image may be obtained despite the very different beam diameters of the reflected primary light P2 and of the converted secondary light S. The microlens field 18 may also be referred to as (in this case two-sided) "eye of the fly".

Even though the present disclosure was illustrated more closely and described in detail by the shown embodiments, the present disclosure is not restricted thereto and other variations may be derived therefrom by a person skilled in the art, without departing from the scope of protection of the present disclosure.

Thus, organic or inorganic light-emitting diodes, for example in the form of individual light-emitting diodes or as an LED field or array, etc., may also be used in place of lasers. The LARP headlamps/spotlights may include further optical elements such as stops, lenses, collimators, etc. The dimensions and/or angle relationships may differ from the embodiments; by way of example, different reflection angles may be set.

Also, a first mirror region may include a plurality of openings arranged on an edge side and/or internal openings with corresponding second mirror regions.

As a matter of principle, there are no restrictions on the shape and/or size of the mirror regions. Thus, the first mirror regions and/or the second mirror regions need not have a rectangular, in particular square, external contour but, for example, may also have a round, oval or free-form outer contour.

The tilt angles of a plurality of second mirror regions need not all be equal but may vary as desired, in particular in a range of the tilt angle from 80° to 100°, in particular from 85° to 95°.

A rotating phosphor wheel which contains one or more sequentially arranged phosphor segments may also be used instead of a stationary phosphor body.

If a plurality of light sources are present, these may consist of light sources with a similar structure or different structures. The light sources, e.g. laser diodes, may vary, in particular, in terms of the frequency, power and method of operation (constant or pulsed operation, ON or OFF) thereof. Thus, in particular, those light sources whose radiation is incident on the second mirror region may emit a different wavelength and have a different mode of operation to the remaining light sources. By way of example, this may apply to laser diodes and to light-emitting diodes.

The second mirror regions may also have different forms, i.e., in particular, in terms of the outer form or contour (round, polygonal, elliptic, free-form, etc.) and/or surface curvature (plane, convex, free-form, etc.) thereof.

Generally, "a(n)", "one", etc. can be understood to mean a singular or a plural, in particular in the sense of "at least one" or "one or more", etc. as long as this is not explicitly excluded, e.g. by the expression "exactly one", etc.

Moreover, a numerical indication can encompass exactly the indicated number and also a customary tolerance range, as long as this is not explicitly excluded.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lighting apparatus comprising at least one primary light source for emitting primary light, at least one phosphor body arranged at a distance from the primary light source, for converting the wavelength of primary light into secondary light, and at least one at least partly dichroic mirror, which at least partly deflects primary light radiated thereon onto at least one phosphor body and which passes secondary light radiated by the phosphor body, wherein used light radiated by the lighting apparatus contains the secondary light and primary light radiated by at least one primary light source, and wherein the at least one at least partly dichroic mirror comprises at least one first dichroic mirror region and at least one second mirror region, in such a way that the at least one first mirror region deflects primary light radiated thereon by at least one primary light source onto at least one phosphor body and passes secondary light incident from the phosphor body, wherein the at least one second mirror region is a non-dichroic mirror region, and that the at least one second mirror region deflects primary light radiated thereon by at least one primary light source in a manner circumventing the phosphor body.

2. The lighting apparatus as claimed in claim 1, wherein an area centroid of the second mirror region is arranged within a plane of extent of the first mirror region.

3. The lighting apparatus as claimed in claim 1, wherein the at least one first mirror region and the at least one second mirror region practically completely fill a radiation cross section of the secondary light.

4. The lighting apparatus as claimed in claim 1, wherein the at least one first mirror region and the at least one second mirror region are parts of a common mirror.

5. The lighting apparatus as claimed in claim 1, wherein the at least one first mirror region and the at least one second mirror region are separately produced mirrors.

6. The lighting apparatus as claimed in claim 1, wherein the at least one first mirror region and/or the at least one second mirror region is a flat mirror region.

7. The lighting apparatus as claimed in claim 1, wherein the at least one second mirror region is a curved mirror region.

8. The lighting apparatus as claimed in claim 1, wherein the at least one second mirror region is arranged with angular offset, in relation to the at least one first mirror region.

9. The lighting apparatus as claimed in claim 1, wherein the at least one second mirror region is arranged in a circumferentially bounded opening.

10. The lighting apparatus as claimed in claim 1, wherein at least one microlens field is disposed downstream of the at least one first mirror region and the at least one second mirror region.

11. The lighting apparatus as claimed in claim 1, wherein the at least one phosphor body is arranged in a reflecting arrangement.

12. The lighting apparatus as claimed in claim 1, wherein the at least one primary light source comprises at least one semiconductor source.

13. The lighting apparatus as claimed in claim 1, wherein the at least one second mirror region is arranged with angular offset through 90° in relation to the at least one first mirror region.

14. The lighting apparatus as claimed in claim 1, wherein the at least one second mirror region is arranged in a central opening, and/or in an opening, open on an edge side, of a first mirror region.

* * * * *